(No Model.)

A. B. LEVY & G. W. DECKER.
DUST PAN.

No. 360,453. Patented Apr. 5, 1887.

WITNESSES
C. W. Dashiell
Wm. N. Moore

INVENTORS
Abram B. Levy.
Geo. W. Decker.
By their Attorneys
C. A. Snow & Co.

UNITED STATES PATENT OFFICE.

ABRAM B. LEVY AND GEORGE W. DECKER, OF CANANDAIGUA, NEW YORK.

DUST-PAN.

SPECIFICATION forming part of Letters Patent No. 360,453, dated April 5, 1887.

Application filed June 10, 1885. Serial No. 168,269. (No model.)

*To all whom it may concern:*

Be it known that we, ABRAM B. LEVY and GEORGE W. DECKER, citizens of the United States, residing at Canandaigua, in the county of Ontario and State of New York, have invented new and useful Improvements in Dust-Pans, of which the following is a specification, reference being had to the accompanying drawings.

Our invention has relation to improvements in dust-pans; and the novelty consists in the construction and combination of parts, substantially as hereinafter fully set forth, and specifically pointed out in the claims.

Figure 1:
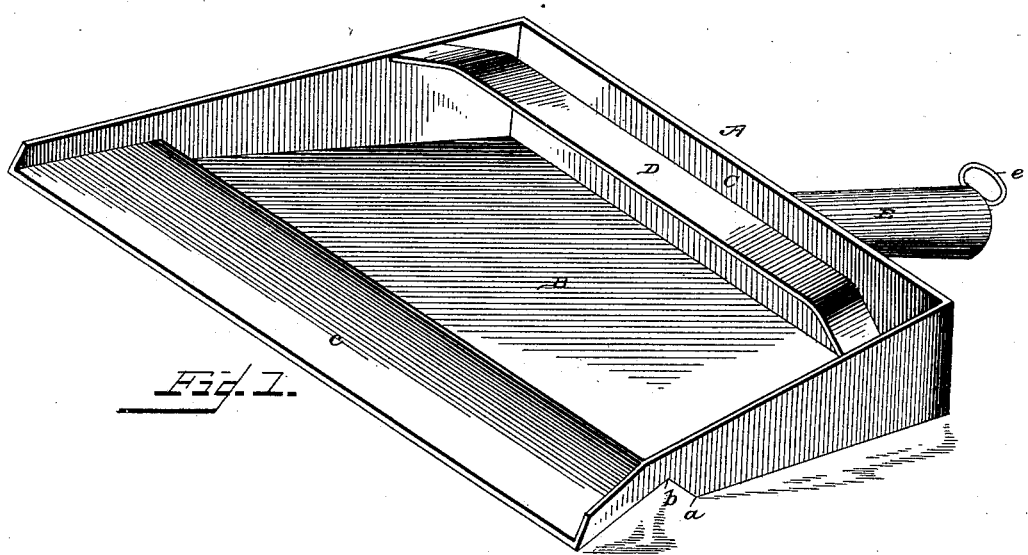
Figure 2:
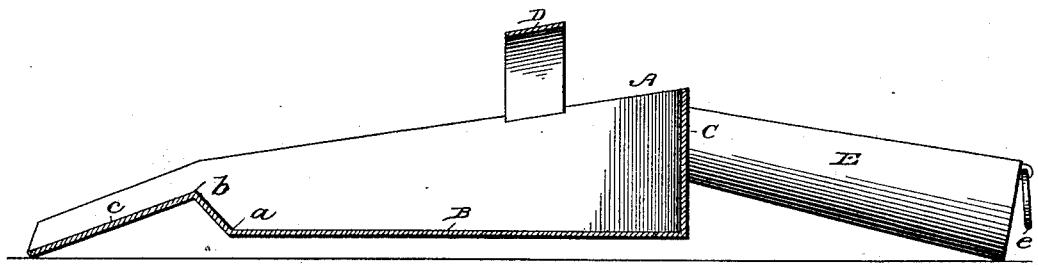

Figure 1 is a perspective view of a dust-pan embodying our invention. Fig. 2 is a longitudinal vertical section of the same.

In the accompanying drawings, in which like letters of reference refer to corresponding parts in both the figures, A represents the dust-pan, which is composed of the bottom B, turned up at its rear end to form the end wall or back, C, of the pan. The bottom is also turned upwardly to form the sides, which are cut off at an incline, so that at their front ends they terminate in a point and gradually grow in height as the rear end of the pan is reached. The bottom is widest at its front end, as shown, to permit the dust and dirt to be readily swept upon the pan. The bottom B of the pan is turned upwardly for a slight distance near its front end, as shown at *a*, and then downwardly in an inclined direction, as shown at *b*, so that the outer edge of the pan will be on a plane a slight distance below the bottom of said pan, thus elevating the body thereof above the floor and out of contact therewith, and provide a ledge which will prevent the dust or dirt from dropping from the pan should the same be slightly inclined. By turning the bottom of the pan upwardly and then downwardly, as shown, it will be seen that a sharp incline, *c*, is provided, and after the dirt has been brushed past the same that it will remain in the pan.

D represents a strip, which extends across the pan, connecting the sides thereof and serving to brace and strengthen the same. In addition to this, said strip serves as a handle by which to carry the pan when the same is full. In sweeping, after the dirt has been brushed upon the pan, there frequently remains a considerable quantity of dirt in the broom, which, as there are no means provided in dust-pans as heretofore constructed, is deposited upon the floor in sweeping. By providing the strip D it will be seen that after the dirt has been brushed upon the pan the dirt may be readily removed from the broom by striking it against the strip D.

E represents the handle, which is provided with a loop or eye, *e*, so that the pan may be suspended from a nail or hook upon the wall. The said handle E extends from the upper rear end of the pan in an inclined direction, so that its outer end will be on a horizontal plane with the bottom of the pan. By this arrangement the pan is supported and prevented from tipping over and spilling its contents, as is frequently the case with dust-pans wherein the handle projects in a straight line from the pan.

In sweeping, the foot may be placed upon the handle, thus holding the pan firmly and securely in place against the floor, and also holding the outer edge of the bottom of the pan in close contact with the floor, so that dust or dirt cannot possibly pass beneath the same. This is an important feature of my invention, since it obviates the necessity of stooping to hold the pan in place while dust or dirt is being swept upon the pan.

The improvements before described, while necessitating but little, if any, outlay in the cost of manufacture over pans as ordinarily constructed, possess many advantages over pans now in general use.

In order to define the nature, scope, and advantages of my invention, I would state that heretofore it has been proposed to provide a dust-pan with a handle and foot-piece made in one piece of metal, both extending in rear of the pan and secured thereto, and the foot-piece having a downward inclination to rest on the floor; also, that a dust-pan has been provided with a frame or bail pivoted thereto, and having a foot-piece secured to the frame and resting on the floor. A dust-pan has also been provided with a single bent lip, inclining downwardly from the plane of the pan and resting on the floor. In my invention the pan has a horizontal body and parallel side walls, to the rear wall of which a handle is secured, said handle extending rearwardly and downwardly therefrom in an inclined direction to the plane of the front edge of the pan, to provide a support for the pan when resting on the floor. The handle also serves as a foot-piece, on which the foot of the attendant is placed to hold the pan against movement and without requiring the attendant to stoop. My improved construction thus dispenses with the use of a separate handle and foot-piece by combining both devices in one, and consequently can be manufactured cheaper, and is simpler.

I am also aware that it is not new to provide the front edge of a pan-bottom with an inclined abutment to form a compartment in the pan from which the dirt cannot escape; but in this device the handle is bent and connected with the pan-bottom, which rests on the floor. This construction is objectionable, in that when any dirt or other matter lies beneath the pan-bottom, as is very often the case, the front thereof is elevated out of contact with the floor, and thus when sweeping dirt with the pan it passes beneath the front edge of the pan and under the bottom thereof, and when the pan is moved across the carpet or floor considerable friction takes place between the pan-bottom and the said carpet, thus wearing the latter away.

In my improved device the means which support the pan—i. e., the lower edge of the inclined front lip, c, and the handle E—are arranged below the plane of the pan-bottom, and hold the same above the floor or carpet and out of contact therewith, whereby, when pressure is placed on the handle by the foot of the person using the device, the pan is held rigidly and securely in place, to keep the inclined lip c closely pressed in contact with the floor or carpet.

In using the device the pan is supported on the floor by the lip c and handle E, and the foot of the attendant is placed on said handle, thus firmly holding the device in place and permitting the broom to be struck against the strip D to shake or throw off dirt from the broom.

I am also aware that it is not new to contract the rear ends of the side walls of the pan-body and connect them by a handle-bail. This construction presents an obstruction to the free entrance of the broom in sweeping the dirt into the body of the pan, and consequently does not serve efficiently to shake the dust from the broom when striking against the strip. In my device the side walls of the pan-body are parallel and are connected by a transverse strip arranged in front of the rear wall thereof, and against which the broom can be struck without hinderance or obstruction from the side walls of the pan, to shake the dust and dirt therefrom.

Having thus described my invention, I claim—

1. As an article of manufacture, the herein-described dust-pan, comprising the body, an inwardly-inclined abutment, a, at the front end of the pan-bottom, to form a receptacle for dust in the pan, a downwardly-inclined lip, c, projecting below the plane of the pan-body, a straight handle, E, rigidly secured at its upper end to the rear wall, C, and inclined downwardly and rearwardly therefrom and also extending below the plane of the pan-body so that the lower end of the handle will be on the same horizontal plane as the lower edge of the lip c, and thus the bottom of the pan will be elevated above the floor, and an unobstructed strip, D, connecting the side walls of the pan in front of the rear wall thereof and projected above the plane of the side walls, arranged and combined, whereby the pressure of the foot on the handle E serves to prevent the pan from moving either while sweeping the dust into the pan or when striking the broom against the strip D to clean the accumulations of matter from the broom, as set forth.

2. As an improved article of manufacture, a dust-pan consisting of a body, A, an abutment, a, at the front end of the body and inclined above the plane of the bottom thereof, an inclined lip, c, extending below the bottom of the body, and a downwardly and rearwardly inclined unyielding handle, E, affixed rigidly to the rear of the body and extended below the bottom thereof and terminating on the same plane with the lower edge of the lip c, whereby, when the pan is placed on the floor, the lip and handle will support the body in a horizontal position and elevate the same above the floor, substantially as described.

In testimony that we claim the foregoing as our own we have hereto affixed our signatures in presence of two witnesses.

ABRAM B. LEVY.
GEORGE W. DECKER.

Witnesses:
ROBERT CHAPIN,
FRANK W. CHESEBRO.